United States Patent [19]

Thériault

[11] Patent Number: 5,096,068

[45] Date of Patent: Mar. 17, 1992

[54] BICYCLE RACK

[76] Inventor: Normand N. Thériault, 1180, Chemin Hemining, Drummondville, Qué., Canada, J2B 7T5

[21] Appl. No.: 678,226

[22] Filed: Apr. 1, 1991

[51] Int. Cl.$^5$ ............................................. A47F 7/00
[52] U.S. Cl. ........................................ 211/22; 211/20
[58] Field of Search ................ 211/22, 20, 21, 19, 211/23, 24, 5, 17; 224/324, 42.03 B

[56] References Cited

U.S. PATENT DOCUMENTS

| 488,395 | 12/1892 | Justice | 211/20 |
| 574,689 | 1/1897 | Stover et al. | 211/20 |
| 3,599,798 | 8/1971 | Osborn | 211/20 |
| 4,050,583 | 9/1977 | Szabo | 211/20 |

FOREIGN PATENT DOCUMENTS

| 258495 | 5/1949 | Switzerland | 211/5 |
| 280711 | 1/1952 | Switzerland | 211/22 |
| 20828 | of 1894 | United Kingdom | 211/20 |
| 456677 | 11/1936 | United Kingdom | 211/22 |

Primary Examiner—Blair M. Johnson
Attorney, Agent, or Firm—Roland L. Morneau

[57] ABSTRACT

The rack according to the present invention is adapted to support, in an upstanding position, a variety of bicycles having wheels of different widths and diameters. The rack includes a bottomless funnel-shaped channel having a pair of spaced parallel walls and a pair of tapered walls. The channel is supported at both ends by a longitudinal beam for raising the channel above the ground. A pair of guiding rails are mounted above the channel and fixed parallel to the tapered walls. The guiding rails have a generally trapezoidal shape. The parallel walls laterally support the bicycle having narrow wheels along their lower segment and vertically support the wheel at both ends of the segment. The bicycle with wider wheels are vertically supported by the tapered walls which slightly squeeze the elastic tires of the wheels. These latter bicycles are held in an upstanding position by the guiding rails which are close to the spokes and allow a nearly nil tilt of the bicycle.

6 Claims, 3 Drawing Sheets

BICYCLE RACK

BACKGROUND OF THE INVENTION

1. Field of the Invention

The present invention relates to a rack for holding a bicycle in an upstanding position and in particular to a rack suitably structured to support the majority of bicycles having various sizes and widths of wheels. The universality of the rack depends on its particular structure combined with dimensions proportionaly adjusted. It has no movable parts.

The bicycles are easy to install on the present rack and maintain their upright position regardless of the dimensions of the bicycle wheels which are commercially available.

2. Prior Art

U.S. Pat. No. 3,202,289 issued on Aug. 24, 1965 discloses a stand for bicycles which makes use of laterally adjustable bars for clamping a wheel of a bicycle so as to hold the latter in an upright position. The stand needs to make use of various types of coupling which allows the adjustment of the bars and of a Z-shape base member.

The bicycle storage device disclosed in Canadian patent No. 1,168,187 issued on May 29, 1984, combines a wheel receiving channel 10 with a hook 11 and a bracket 12 for gripping the lowermost part of the wheels of a bicycle. The channel has a flat base portion 10a which prevents even the narrowest wheel from sliding below the channel. The hook grips the rim of the wheel adjacent the channel and does not take in consideration the spokes of the wheel.

Canadian patent No. 1,222,722 issued to P. T. Drake on June 9, 1987 describes a kit for assembling a bicycle rack. The loops 19 laterally hold the wheels. The lower and the upper part of the loops are at the same distance from each other. Accordingly, the lower part cannot be adjustly fit for all sizes of wheels and accordingly the bicycle will tilt sideways. The lower part of the loop is supported by the tubes 13 and 15 and is close to the ground. The wheel of the bicycle is generally susceptible to touching the ground. Furthermore, the distance between the tubes 13 and 15 is relatively small and does not allow the wheel to penetrate much below the level of those tubes. Partly for this reason, Drake includes a third tube 17, to prevent the forward movement of the bicycle.

SUMMARY OF THE INVENTION

The rack according to the present invention is adapted to support, in an upstanding position, a variety of bicycles having wheels of different widths and diameters. The rack includes a bottomless funnel-shape channel having a pair of spaced parallel walls and a pair of tapered walls. The channel is supported at both ends by a longitudinal beam for raising the channel above the ground. A pair of guiding rails are mounted above the channel and fixed parallel to the tapered walls. The guiding rails have a generally trapezoidal shape. The parallel walls laterally supports the bicycle having narrow along their lower segment and vertically support the wheel at both ends of the segment. The bicycle with wider wheels are vertically supported by the tapered walls which slightly squeezes the elastic tires of the wheels. These latter bicycles are held in an upstanding position by the guiding rails which are close to the spokes and allows a nearly nil tilt of the bicycle.

DETAILED DESCRIPTION OF THE PREFERRED EMBODIMENT

Figure 1:
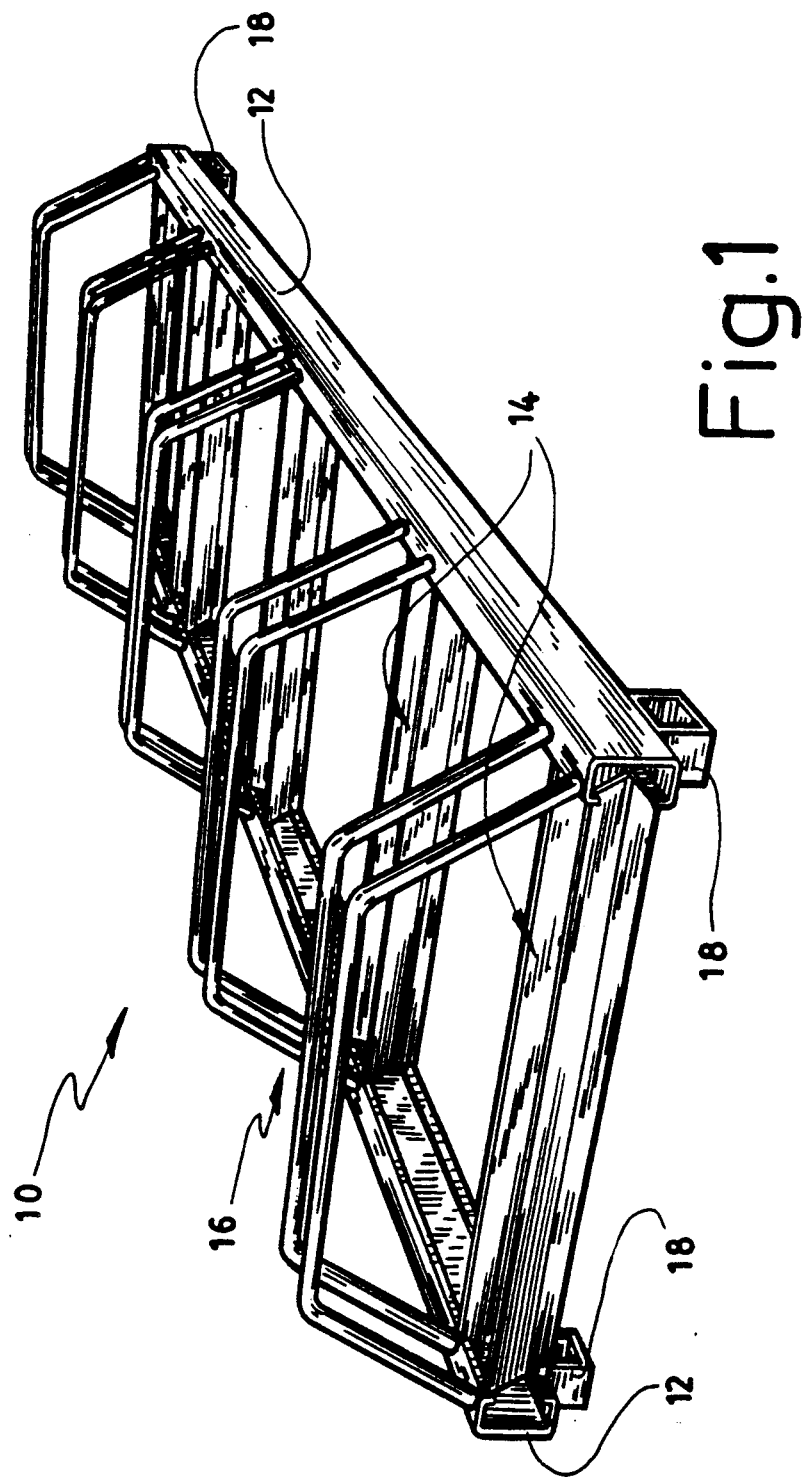
FIG. 1 is a perspective view of the bicycle rack according to one embodiment of the invention.
Figure 4B:
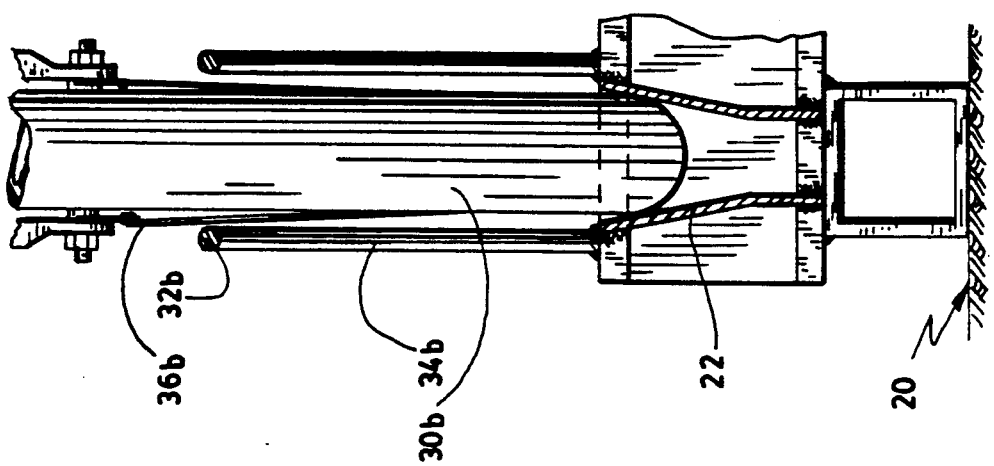
FIG. 4 is a cross-sectional view taken along line 4—4 of FIG. 2, and FIGS. 4a and 4b are two views of the rack similar to FIG. 4 and supporting two different bicycle wheels.
Figure 4A:
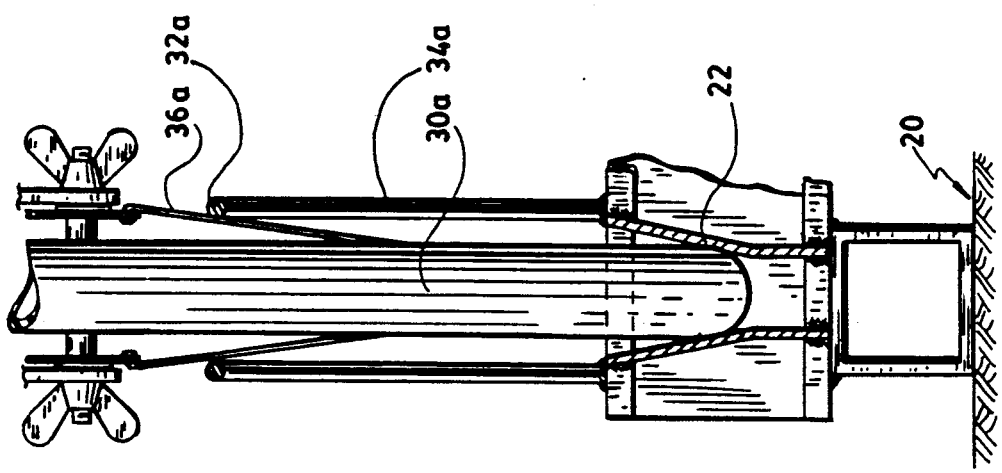

Referring to FIG. 1, there is shown a bicycle rack 10 embodying the invention. The rack 10 has a pair of longitudinal beams 12 adapted to support a set of bottomless channels 14. A pair of guiding rails 16 project upwardly on each side of each channel 14. As illustrated in FIGS. 4a and 4b, the guiding rails 16 are adapted to abuttingly support the spokes 36 of a bicycle wheel 30. A pair of transversal beams 18 are secured adjacent to each end of each longitudinal beam 12. The transversal beams 18 are adapted to rest on the ground 20 thus maintaining the longitudinal beams 12 distant from the ground 20.

Figure 4:
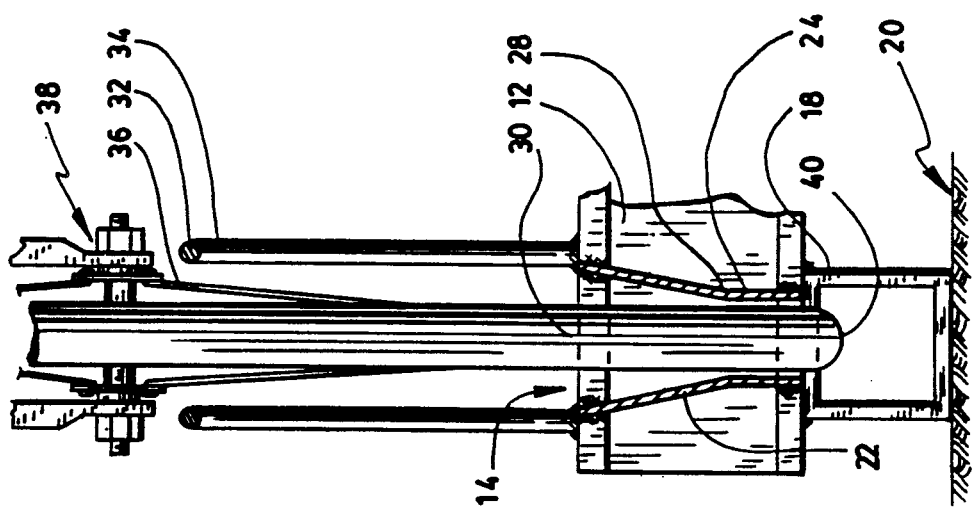

As illustrated in FIGS. 4, 4a and 4b, the channel 14 is funnel-shaped having tapered walls 22 extending integrally into a pair of parallel walls 24. The width of the lower edge 28 of the tapered walls 22 is approximately one inch. The lower segment of a wheel 30 having a width equal or inferior to about one inch can thus fittingly slide through the lower edge 28 as illustrated in FIG. 4. The parallel walls 24 are adapted to laterally abut the lower segment of the wheel 30 when the latter extends through the lower edge 28. The projection of the wheel 30 between the parallel walls 24 allows the periphery of the wheel to be abuttingly supported by the longitudinal beams 12.

As illustrated in FIGS. 4a and 4b, for wider wheels 30a and 30b, the tapered nature of the walls 22 allows them to abuttingly support the lower segment 40 of wheels having various widths greater than one inch. The guiding rails 16 have a generally upsidedown truncated V-shape or trapezoidal shape with transversal bars 32 substantially parallel to the channel 14 and tilted bars 34 connected at each extremity to the longitudinal beams 12. The vertical distance between the transversal bars 32 and the lower edge 28 of the tapered walls 22 is approximately 7½ inches in order to properly support most conventional wheels. The transversal bars 32 lie close to the spokes 36 adjacent the hub 38 of the wheel 30. The transversal bar 32 has a length of about 12 inches.

Contrary to the racks described in the previously cited prior art, the rack 10 embodying the present invention is thus particularly adapted to solidly support wheels of various widths and diameters. This feature is particularly useful since an increasingly large number of specialized bicycle types such as mountain bikes, hybrid bikes, racing bikes, town bikes, etc. having different types of wheels and frames are finding their way in the market place.

When heavier bicycles such as town bikes or hybrid bikes having larger wheels are used, the rack, as illustrated in FIGS. 4a and 4b, provides a structure allowing two different sections of the wheel to be abuttingly supported. This is a major improvement over the structure provided in Canadian patent No. 1,168,187 which could hardly be used with a relatively heavy bicycle.

The lighter bicycles, such as racing bikes, which generally have wheels with a width equal or slightly inferior to one inch are supported differently by the noval rack than the bicycles having wider and smaller wheels but both securily remains in an upstanding position.

Figure 2:
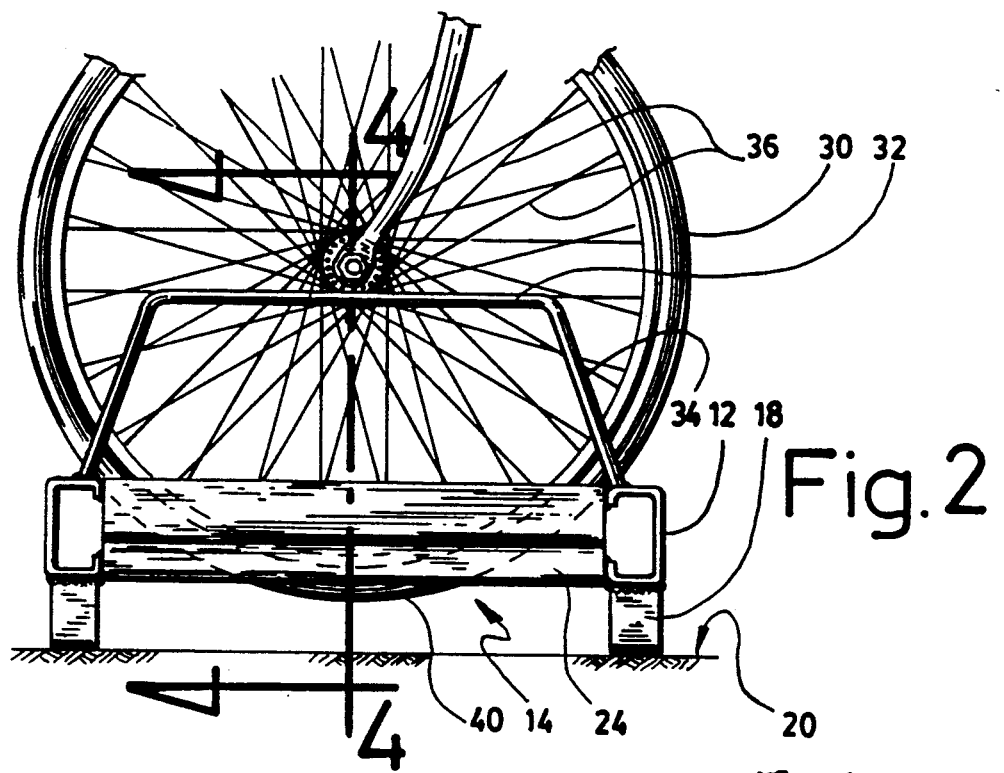
FIG. 2 is a side view of the rack supporting a bicycle wheel.
Figure 3:
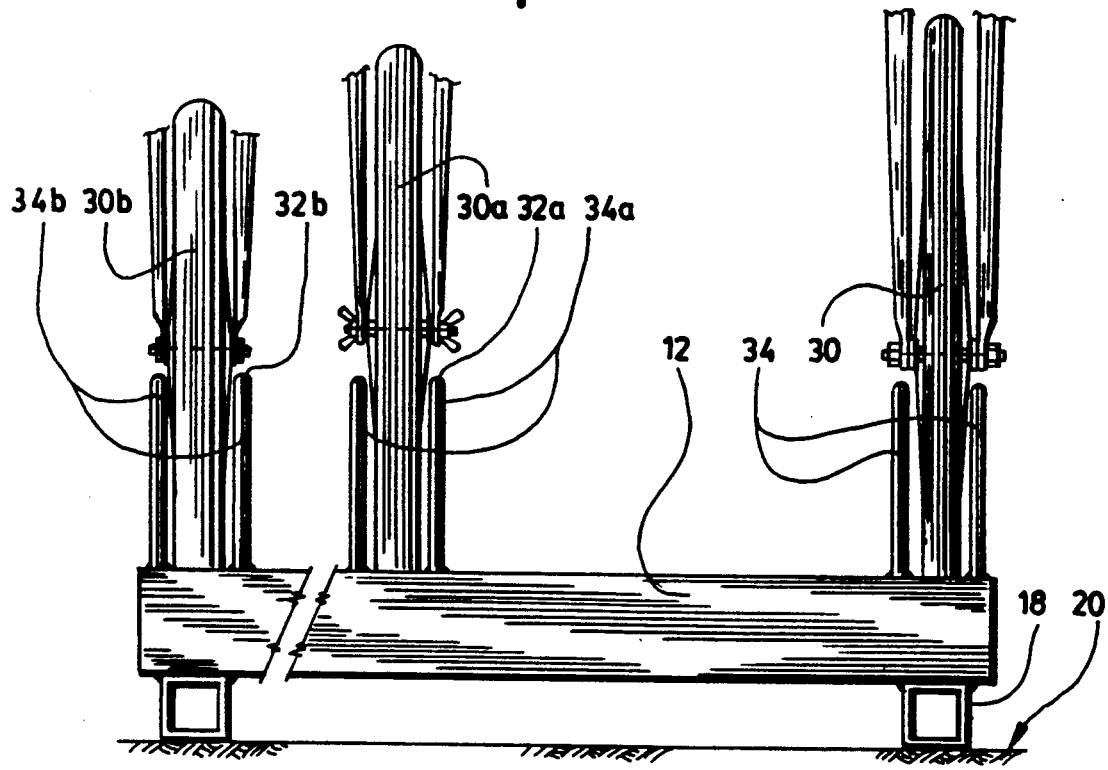
FIG. 3 is a front view of the rack supporting three bicycles.

In the embodiment shown in FIG. 2, an important segment 40 of the wheel 30 is relatively squeezed between the parallel walls 24 for a lateral support while the beams 12 provide the vertical support. The spokes 36 are spaced from the transversal bars 32 by a distance of about ⅛ inch on each side which allows the bicycle a maximum tilt of less than 1 degree. The bicycle is accordingly maintained substantially straight without any substantial lateral pressure on the spokes when tilted. In the embodiments shown in FIGS. 3, 4a and 4b, the wheels 34a and 34b penetrates more or less deeply between the tapered walls for a vertical support of the bicycle while the transversal bars 32a and 32b lie close to the spokes 36a and 36b within a short distance of the hubs 38a and 38b where the spokes have substantially their widest spread. The maximum distance between the spokes and the transversal bars 32a and 32b is less than ¼ inch and accordingly can maintain the bicycle in a substantially vertical position.

The bicycle rack according to the invention makes use of the characteristic of the commercially available bicycles wherein all the hubs have the same width and the spokes 36, 36a and 36b can be adjacent the respective transversal bars 32, 32a and 32b. The proximity of the latter bars and the spokes is maintained by the degree of penetration of the wheels in the channels.

The support offered by the rack 10 is different from the one offered by the structure described in Canadian Patent No. 1,168,187. Indeed since the channels 14 are bottomless, contrary to the channels referred to by numeral 10 in Canadian patent No. 1,168,187 which have a flat base 10a, the tires can be inserted through the openings and can thus be gripped about the lower segment 40 of the wheel 30 over a relatively large area by the walls 24.

I claim:

1. A rack adapted to upstandingly and selectively hold bicycles with wheels having a variety of wheel diameters and widths, said wheels having a rim and a set spokes, said rack comprising a bottomless channel having a pair of spaced parallel walls and a pair of tapered walls integrally extending from said parallel walls for forming a funnel-shaped cross-section for laterally receiving the lower segment of a front wheel of a bicycle, said spaced parallel walls adapted to allow wheels of equal or smaller width to slide downwardly therebetween and said tapered walls adapted to support therebetween wheels of larger width, a pair of longitudinal beams for supporting said channel at each end thereof, said beams adapted to support said wheel at each end of said segment when said wheel has a width equal or smaller than the space between the parallel walls, a pair of parallel guiding rails longitudinally projecting upwardly from said tapered walls on each side of said channel, said rails having a generally upsidedown truncated V-shape secured to said beams adjacent both ends of said channel, each of said rails having a transversal straight bar substantially parallel to said channel, said transversal bars adapted to laterally and adjacently extend along the spokes of said wheels, the distance between said transversal bars being adapted to allow a tilt of the wheel not greater than about 1 degree, transversal beams disposed below said longitudinal beams, said transversal beams adapted to maintain said spaced parallel walls at a distance above the ground to prevent said segment of said wheel having equal or smaller width from being hindered to slide downwardly, said rack being characterized in that the space between the parallel walls is about a minimum of 1 inch to allow the bicycle wheel having equal or smaller widths to fittingly slide downwardly therethrough, the distance between said beams corresponding to the length of said segment being about 18 inches and the distance between the transversal bar and the channel is about 5½ inches, whereby when said wheel having a width equal or smaller than the space between said parallel walls is inserted in said rack, said wheel is vertically supported by said longitudinal beams and prevented from tilting by said parallel walls which squeezingly abut against said rim and whereby when said wheel of larger width are inserted in said rack, said wheel is vertically supported by said tapered walls and presented from tilting by said rails abutting against said spokes.

2. A bicycle rack as recited in claim 1, wherein the height of said parallel walls is about 1 inch.

3. A bicycle rack as recited in claim 2, wherein the tapering angle between said tapered walls is about 20 to 25 degrees, the channel has a minimum height of about 3 inches and the distance between said transversal bars is about 1¾ inch to 2 inches.

4. A bicycle rack as recited in claim 3, wherein the distance between the transversal bars and the lower edge of the tapered walls is about 7½ inches.

5. A bicycle rack as recited in claim 4, wherein the lower edge of said parallel walls are adapted to lie at a minimum distance of 2 inches above the ground.

6. A bicycle rack as recited in claim 5, wherein the rail has a trapezoidal shape and the transversal bar has a length of about 12".

* * * * *